US011720077B2

(12) United States Patent
Mochida (10) Patent No.: US 11,720,077 B2
(45) Date of Patent: *Aug. 8, 2023

(54) MACHINING ROUTE DISPLAY DEVICE

(71) Applicant: Fanuc Corporation, Yamanashi (JP)

(72) Inventor: Takeshi Mochida, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 169 days.

This patent is subject to a terminal disclaimer.

(21) Appl. No.: 16/902,558

(22) Filed: Jun. 16, 2020

(65) Prior Publication Data

US 2020/0393809 A1 Dec. 17, 2020

(30) Foreign Application Priority Data

Jun. 17, 2019 (JP) ................................. 2019-112256

(51) Int. Cl.
*G05B 19/402* (2006.01)

(52) U.S. Cl.
CPC .. *G05B 19/402* (2013.01); *G05B 2219/39573* (2013.01); *G05B 2219/45165* (2013.01)

(58) Field of Classification Search
CPC ...... G05B 19/4068; G05B 2219/39573; G05B 19/19; G05B 2219/35481; G05B 2219/45041; G05B 19/4069; G05B 19/402; G05B 2219/45165; B23K 26/702; B23K 26/032; B23K 26/38; B23K 26/705; B23K 37/0258; B23K 37/0288; B23K 26/0876; B23Q 15/00
See application file for complete search history.

(56) References Cited

U.S. PATENT DOCUMENTS

| 5,317,518 | A | 5/1994 | Fujita et al. |
| 5,830,150 | A * | 11/1998 | Palmer .................. A61B 5/339 600/523 |
| 8,432,120 | B2 | 4/2013 | Iwashita et al. |
| 9,304,507 | B2 | 4/2016 | Tezuka et al. |
| 10,451,738 | B2 | 10/2019 | Murakami |
| 2003/0216830 | A1* | 11/2003 | Hasebe .............. G05B 19/4068 700/184 |
| 2016/0082545 | A1* | 3/2016 | Kurokawa ............. B23K 26/04 700/166 |

(Continued)

FOREIGN PATENT DOCUMENTS

| JP | 04123107 A | 4/1992 |
| JP | 07072914 A | 3/1995 |

(Continued)

*Primary Examiner* — Kenneth M Lo
*Assistant Examiner* — Tameem D Siddiquee
(74) *Attorney, Agent, or Firm* — RatnerPrestia (57) ABSTRACT

A machining route display device includes a display section for displaying a machining route based on coordinate values of a laser machining head calculated by a laser machining head coordinate calculator and display formats set by a first display format setting section and a second display format setting section. At least one of a display color of first data and a shade of the display color of the first data is changed in accordance with the first data acquired by a first data acquiring section, and at least one of a display color of second data and a shade the display color of the second data is changed in accordance with second data acquired by a second data acquiring section.

5 Claims, 6 Drawing Sheets

(56) References Cited

U.S. PATENT DOCUMENTS

2017/0235293 A1\* 8/2017 Shapiro .................. B23Q 17/22
700/166
2019/0113335 A1\* 4/2019 Satoyoshi .......... G01B 11/0608

FOREIGN PATENT DOCUMENTS

| JP | 2012022404 A | 2/2012 |
|----|--------------|--------|
| JP | 2013045332 A | 3/2013 |
| JP | 2014133231 A | 7/2014 |
| JP | 2018008290 A | 1/2018 |
| JP | 6506341 B | 4/2019 |

\* cited by examiner

MACHINING ROUTE DISPLAY DEVICE

BACKGROUND OF THE INVENTION

1. Field of the Invention

The present invention relates to a machining route display device that displays a machining route or trace for laser machining.

2. Description of the Related Art

When machining, for example, cutting, an object to be machined (hereinafter simply referred to as a "workpiece") by laser machine, a laser machining head is moved along a desired machining route above the workpiece. Displaying a machining route on a display section is widely known.

Japanese Patent No. 6506341 discloses that, when a machining route is displayed, "at least one of the display color of the laser and the shade of the display color is changed in accordance with laser output values acquired by laser output acquiring section."

SUMMARY OF THE INVENTION

In Japanese Patent No. 6506341, when machining defects occur, by referring to the display color and shade thereof in the machining route, it is possible to determine the place where laser output was excessively large or excessively small.

However, in actual laser machining, various factors other than the magnitude of laser output may cause machining defects in the workpiece.

Therefore, there is a need for a machining route display device with which the relationship between the machining route and various data related to laser machining can be easily recognized.

According to a first aspect of the present disclosure, there is provided a machining route display device for displaying a machining route in a laser machine for laser machining a workpiece with a laser output from a laser machining head while relatively moving the laser machining head and the workpiece with at least one drive shaft, the device comprising a positional information acquiring section configured to acquire positional information of the at least one drive shaft for each predefined control cycle, a laser machining head coordinate calculator configured to calculate a coordinate value of the laser machining head from the positional information of the at least one drive shaft and machine configuration information of the laser machine, a first data acquiring section configured to acquire first data relating to the laser machining, a second data acquiring section configured to acquire second data relating to the laser machining, a first display format setting section configured to set at least one of a display color of the first data and a shade of the display color as a display format of the first data, a second display format setting section configured to set at least one of a display color of the second data and a shade of the display color as a display format of the second data, and a display section configured to display the machining route based on coordinate values of the laser machining head calculated by the laser machining head coordinate calculator and the display formats set by the first display format setting section and the second display format setting section, wherein at least one of the display color of the first data and the shade of the display color of the first data is changed in accordance with the first data acquired by the first data acquiring section, and at least one of the display color of the second data and the shade of the display color of the second data is changed in accordance with the second data acquired by the second data acquiring section.

In the first aspect, since the machining route is displayed after the display formats of the first data and the second data are set according to the respective values of the first data and the second data relating to laser machining, the relationship between the machining route and the first data and the second data can be easily recognized.

The objects, features and advantages of the present invention will become more apparent from the following description of the embodiments taken in conjunction with the accompanying drawings.

DETAILED DESCRIPTION

The embodiments of the present invention will be described below with reference to the accompanying drawings. Corresponding components are denoted by common reference numerals throughout the drawings.

Figure 1:
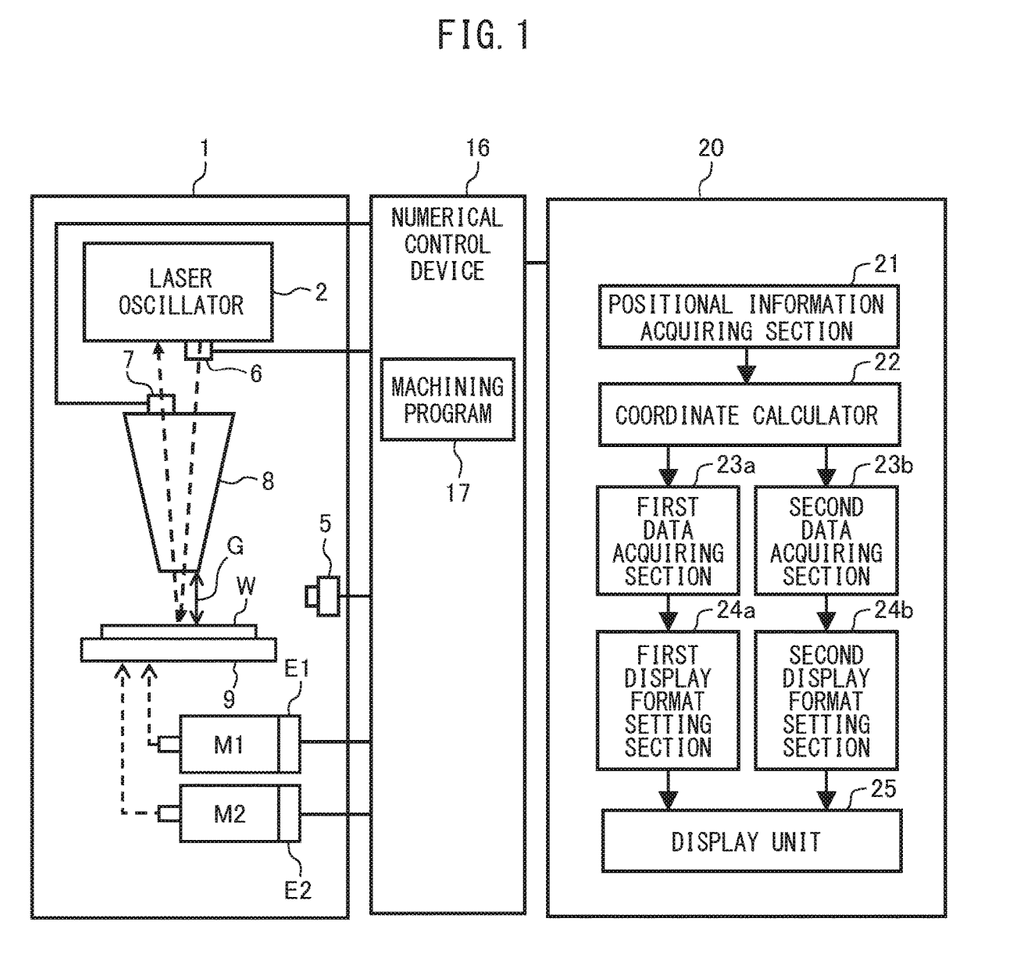
FIG. 1 is a functional block diagram of a machining route display device according to a first embodiment.

FIG. 1 is a functional block diagram of a machining route display device according to a first embodiment. As shown in FIG. 1, the machining route display device 20 is connected to a laser machine 1 via a numerical control device 16.

The laser machine 1 includes a laser oscillator 2. A laser power sensor 6 for detecting the actual output value of the oscillated laser is arranged in the laser oscillator 2. Further, a reflected light acquiring section 7 for detecting actual values of reflected light reflected by a workpiece W, which will be described later, is disposed on a laser machining head 8 of the laser machine 1. The reflected light acquiring section 7 may be a laser power sensor different from the laser power sensor 6.

A laser output from the laser machining head 8 performs machining, for example, cutting of a workpiece W placed on a movable stand 9. The movable stand 9 is movable on an XY-plane. X direction and Y direction drive shafts of the movable stand 9 are coupled to respective motors, e.g., servomotors M1 and M2. The servomotors M1 and M2 are respectively equipped with position detectors E1 and E2, e.g., encoders that detect actual positions of the drive shafts for each predefined control cycle. Further, a gap measuring unit 5, for example, a camera, for measuring a gap G between the workpiece W and the leading end of the laser machining head 8 is disposed and connected to a numerical control device 16.

The movable stand 9 may be moved in at least one direction, and is provided with a number of drive shafts and motors corresponding to the number of movable directions. Alternatively, the table on which the workpiece W is placed may be fixed, and the laser machining head 8 may be moved in the X-Y plane by servomotors M1 and M2.

The numerical control device 16 has a machining program 17 for machining the workpiece W by means of lasers, and the laser machine 1 is controlled in accordance with the machining program 17. The machining program 17 includes information of movements of the respective drive shafts. Such information is converted as appropriate and is acquired as positional information by a positional information acquiring section 21, which is described later.

The machining route display device 20 is a digital computer and includes a CPU, memory, etc., connected to each other via a bus, etc. The machining route display device 20 includes a positional information acquiring section 21 for obtaining positional information of at least one drive shaft of movable stand 9 for each predetermined control cycle. The positional information is determined from the machining program 17 or by position detectors E1 and E2 attached to servomotors M1, M2 driving at least one drive shaft.

The machining route display device 20 further comprises a laser machining head coordinate calculator 22 for calculating the coordinate values of the laser machining head 8 from the positional information of the at least one drive shaft and machine configuration information of the laser machine 1. The machining route display device 20 further includes a first data acquiring section 23a for acquiring first data relating to laser machining, and a second data acquiring section 23b for acquiring second data, which is different from the first data, relating to laser machining.

The first data acquired by the first data acquiring section 23a is at least one of a laser output command value of the laser machining head 8 obtained from the machining program 17 and the actual laser output value of the laser machining head 8 obtained using the laser power sensor 6, an actual value of the reflected light obtained using the reflected light acquiring section 7, or a gap quantity G obtained using the gap measuring unit 5. The second data acquired by the second data acquiring section 23b is the same as the first data. The machine configuration information of the laser machine 1 mainly means the dimensions of the laser machine 1.

When each of the first data acquiring section 23a to the second data acquiring section 23b acquires at least one of the laser output command value of the laser machining head 8 obtained from the machining program 17 and the actual laser output value of the laser machining head 8 obtained using the laser power sensor 6, each of the first data acquiring section 23a and the second data acquiring section 23b may be referred to as a laser output acquiring section.

The machining route display device 20 further includes a first display format setting section 24a for setting a display format of the first data according to the value of the first data acquired by the first data acquiring section 23a, and a second display format setting section 24b for setting a display format of the second data according to the value of the second data acquired by the second data acquiring section 23b. The machining route display device 20 further includes a display section 25 for displaying the machining route of the laser machining based on the coordinate values of the laser machining head 8 calculated by the laser machining head coordinate calculator 22 and the display formats set by the first display format setting section 24a and the second display format setting section 24b.

The CPU of the machining route display device 20 serves as the positional information acquiring section 21, the laser machining head coordinate calculator 22, the first data acquiring section 23a, the second data acquiring section 23b, the first display format setting section 24a, and the second display format setting section 24b. The display section 25 may be a liquid crystal display, a CRT, or the like.

Figure 2:
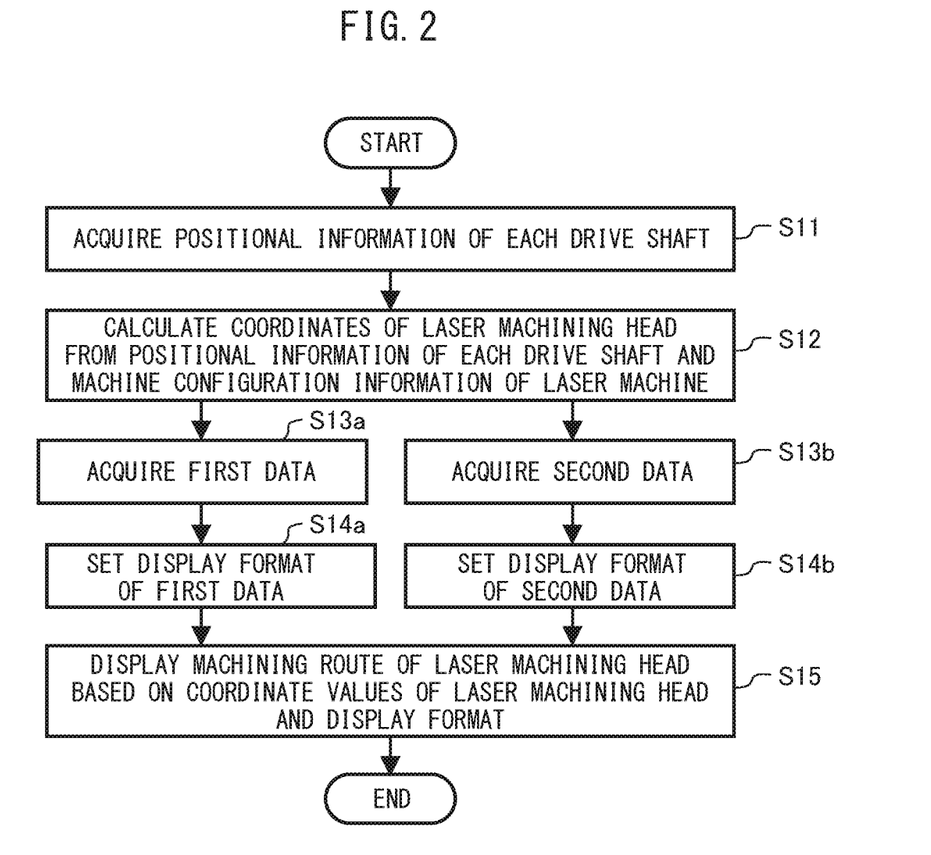
FIG. 2 is a flowchart illustrating the operations of the machining route display device according to the first embodiment.

FIG. 2 is a flowchart illustrating the operations of the machining route display device according to the first embodiment. In the following explanation, it is assumed that the first data acquiring section 23a is the laser power sensor 6 and the second data acquiring section 23b is the gap measurement unit 5.

First, in step S1 of FIG. 1, the positional information acquiring section 21 acquires the positional information of each drive shaft of the movable stand 9 for each unit time. The positional information can be a position command of each drive shaft acquired from the machining program 17 and/or an actual position of each drive shaft detected by the position detectors E1 and E2. For the sake of brevity, the positional information will be described as a position command.

Then, in S12, the coordinate calculator 22 calculates the coordinates of the laser machining head 8 for each unit time based on the positional information. In the case where the positional information is acquired from the machining program 17, the coordinates of the laser machining head 8 constitute the commanded machining route of the laser. In the case where the positional information is determined from the position detectors E1 and E2, the coordinates of laser machining head 8 constitute the actual machining route of the laser.

Then, in step S13a, the first data acquiring section 23a (laser power sensor 6) acquires the first data (actual laser output value) for each unit time, and in step S13b, the second data acquiring section 23b (gap measuring unit 5) acquires the second data (gap amount G) for each unit time.

In step S14a, the first display format setting section 24a sets the display format of the machining route in accordance with the first data obtained in step S13a.

Figure 3:
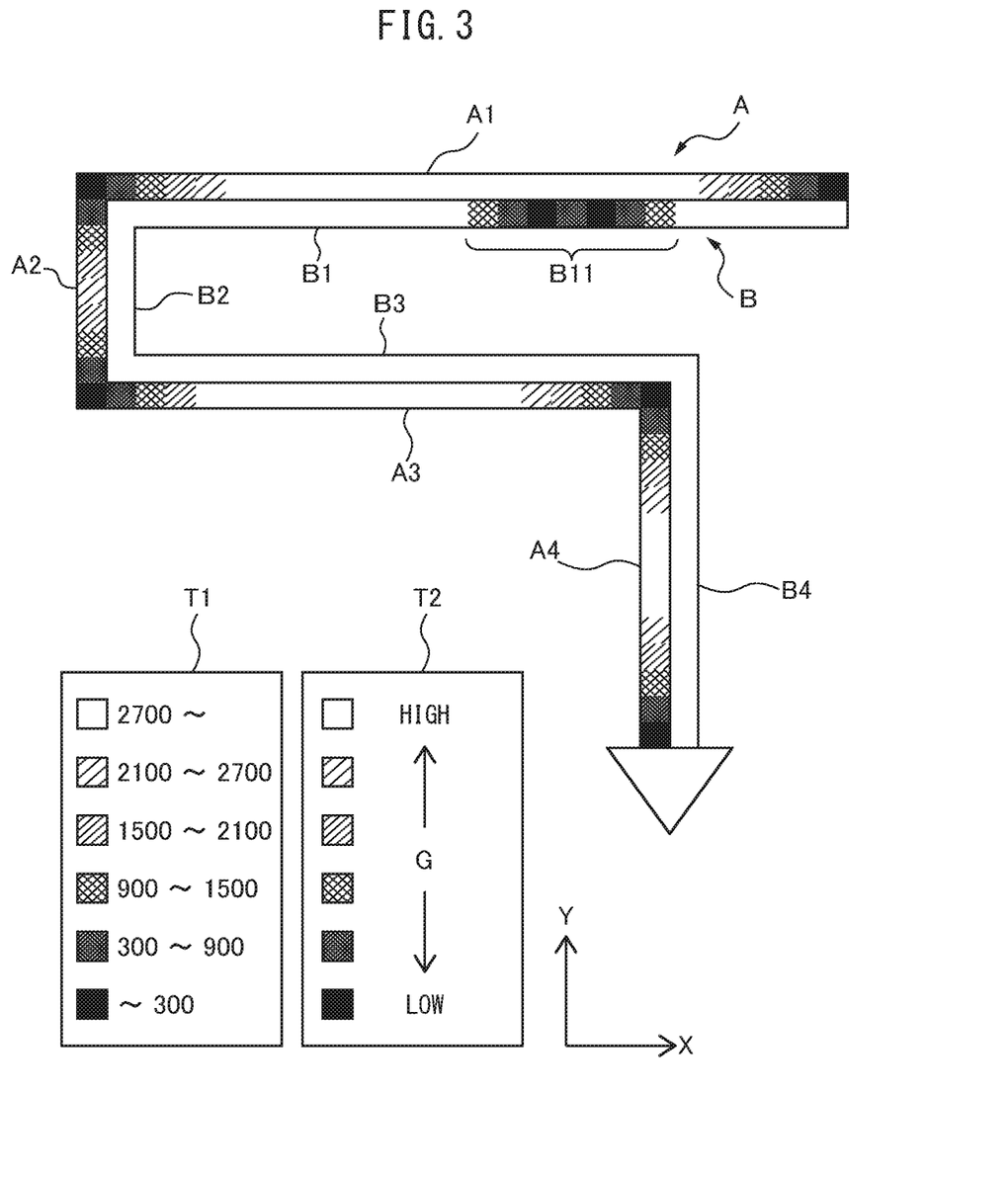
FIG. 3 is a view showing an example of a machining route.

FIG. 3 is a view showing an example of a machining route. In FIG. 3, machining routes A and B composed of a plurality of line segments extending in the X direction and the Y direction are shown juxtaposed with each other. The machining route A shown in FIG. 3 is composed of line segments A1 to A4, and the machining route B is composed of line segments B1 to B4. Line segments A1, A3 and line segments B1, B3 extend only in the X direction and line segments A2, A4 and lines segment B2, B4 extend only in the Y direction. Each of line segments A1 to A4 and line segments B1 to B4 may have components in both the X direction and the Y direction. The arrow shown in FIG. 3 indicates the direction of travel of the laser machining head 8. The same applies to other FIGS. 4 and 6.

In the lower left of FIG. 3, tables T1 and T2 are shown. Table T1 shows the shades of the colors of the machining route A determined according to the magnitude of the actual laser output value. Table T1 is prepared in advance in the first display format setting section 24a. Specifically, in table T1, laser output values are divided into a plurality of levels, for example, six levels. The lowest level of laser output value (up to 300 W) is set to the lightest color, e.g., white, and the highest level of laser output value (2700 W and greater) is set to the darkest color, e.g., black. In the levels therebetween, the shades gradually darken from the lightest color level to the darkest color level.

Table T2 shows the shades of the colors of the machining route B determined according to the gap amount G. In the same manner as described above, in table T2, the gap amount G is divided into a plurality of levels, for example, six levels. The level with the largest gap amount G is set to the lightest color, for example, white, and the level with the smallest gap amount G is set to the darkest color, for example, black.

In step S14a, the first display format setting section 24a sets the shades of the colors of the coordinate values for each control cycle of laser machining head 8 in accordance with the magnitude of actual laser output value. Further, in the step S14b, the second display format setting section 24b sets the shades of the colors of the coordinate values for each control cycle of the laser machining head 8 in accordance with the gap amount G. In FIG. 3, the first display format setting section 24a and the second display format setting section 24b are set so that their shades change between white and black.

In an unillustrated embodiment, the display format setting sections 24a, 24b may vary in hue among a large number of colors. For example, the lowest level of actual laser output value or gap amount G is set to blue, the greatest level of actual laser output value or gap amount G is set to yellow, and the intermediate level therebetween is set to red. The hues may gradually change between the level of blue and the level of red, and between the level of red and the level of yellow.

Referring again to FIG. 2, in S15, the display section 25 displays the machining route A and the machining route B based on the coordinate values of the laser machining head 8 and the first display format and the second display format, respectively. As shown in FIG. 3, the machining route A and the machining route B are displayed after the display formats of the lasers, for example, the shades of the colors, are set in accordance with actual laser output value and the gap amount G, respectively. With such a configuration, it will be understood that the operator can intuitively recognize the relationship between the machining route and the laser output and the gap amount G.

For example, in FIG. 3, it can be seen that laser output decreases at the corner portions of the machining route A, i.e., at the connecting portions of the respective line segments A1 to A4. Furthermore, in FIG. 3, line segment A2 is shorter than the other line segments A1, A3, A4. As a result, line segment A2 does not have the greatest and lightest shade level of laser output values. In other words, since line segment A2 is short, it can be understood that line segment A2 cannot exhibit the highest laser output.

The surface of the workpiece W to be subjected to laser machining is not constantly smooth, and the surface may be wavy. In such cases, the laser machining head 8 collides with the workpiece W at the time of laser machining along the machining routes A and B, and the laser machining head 8 becomes damaged or a machining defect occurs in the workpiece W.

In this regard, in FIG. 3, the gap amount G between the laser machining head 8 and the workpiece W can be recognized in association with the machining route B. For example, referring to portion B11 of line segment B1 of the machining route B, it can be understood that the workpiece W is undulated at this position with the gap amount G being small. Therefore, when the laser machining head 8 collides with the workpiece W, it is possible to easily recognize that the collision position of laser machining head 8 is the portion B11. Therefore, it is possible to prevent the laser machining head 8 from colliding with the subsequent workpiece W by locally raising the position of laser machining head 8 relative to the workpiece W or smoothing the workpiece W in advance.

To this end, it is also possible to include a servomotor M3 for driving the movable stand 9 in the Z-direction and an encoder E3 (neither of which is shown) mounted on the servomotor M3. In this instance, by locally lowering the movable stand 9, it is possible to prevent the laser machining head 8 from colliding with the workpiece W.

Figure 4:
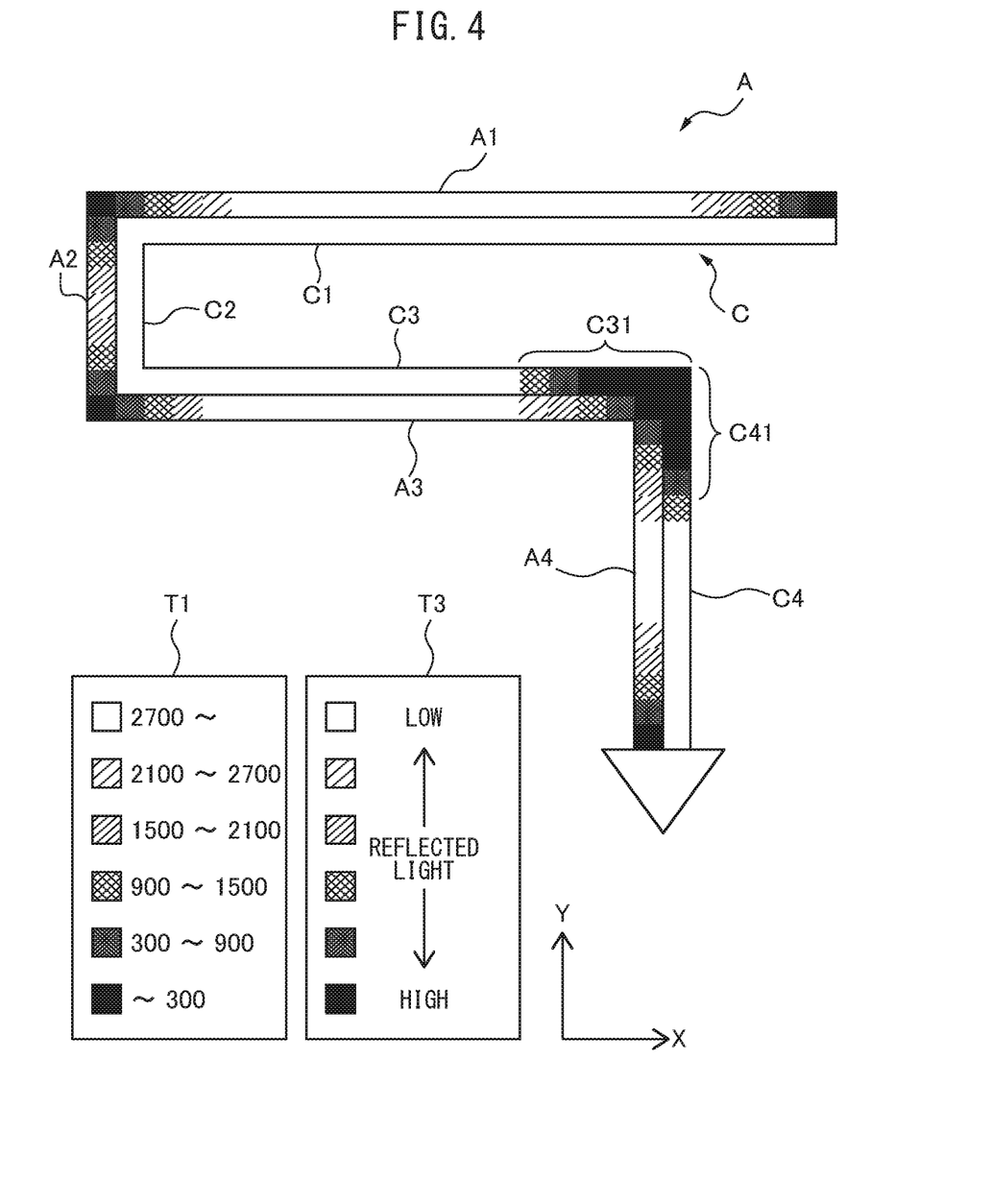
FIG. 4 is a view similar to FIG. 3 showing another example of the machining route.

FIG. 4 is a view similar to FIG. 3 showing another example of a machining route. In this instance, the first data acquiring section 23a is the laser power sensor 6, and the second data acquiring section 23b is the reflected light acquiring section 7. Table T3 in FIG. 4 shows the shades of the colors of the machining route C determined according to the magnitude of the reflected light. In the same manner as described above, in table T3, the magnitude of the reflected light is divided into a plurality of levels, for example, six levels. The lowest level of reflected light is set to the lightest color, e.g., white, and the highest level of the reflected light is set to the darkest color, e.g., black. Since the procedures of machining routes A and C in FIG. 4 are the same as those described with reference to FIG. 2, descriptions thereof have been omitted.

For example, at the time of laser machining, the reflected light reflected by the laser on the workpiece W may enter the laser machining head 8 and damage the laser machining head 8 and the laser oscillator 2. However, since the magnitude of the reflected light changes not only according to the machining routes A, B and actual laser output value but also according to the shapes of the laser machining head 8 and the type of the workpiece W, the operator cannot normally predict the magnitude of the reflected light. For this reason, there is a risk that the reflected light will change greatly at a place that the operator does not intend. If the laser machining head 8 or the laser oscillator 2 is damaged by the reflected light, the workpiece W may have machining defects.

In this regard, in FIG. 4, the reflected light can be recognized in association with the machining route C. For example, referring to portion C31 of line segment C3 and portion C41 of line segment C4 of the machining route C, it can be seen that as the laser machining head 8 rotates clockwise, the reflected light increases locally. Therefore, when the laser machining head 8 or the laser oscillator 2 is damaged by the reflected light, it is possible to easily recognize that the positions of laser machining head 8 when being damaged are the portions C31 and C41. Thus, for a subsequent workpiece, it is possible to prevent the laser machining head 8 and the laser oscillator 2 from becoming damaged by locally reducing laser output in the portions C31 and C41.

Figure 5:
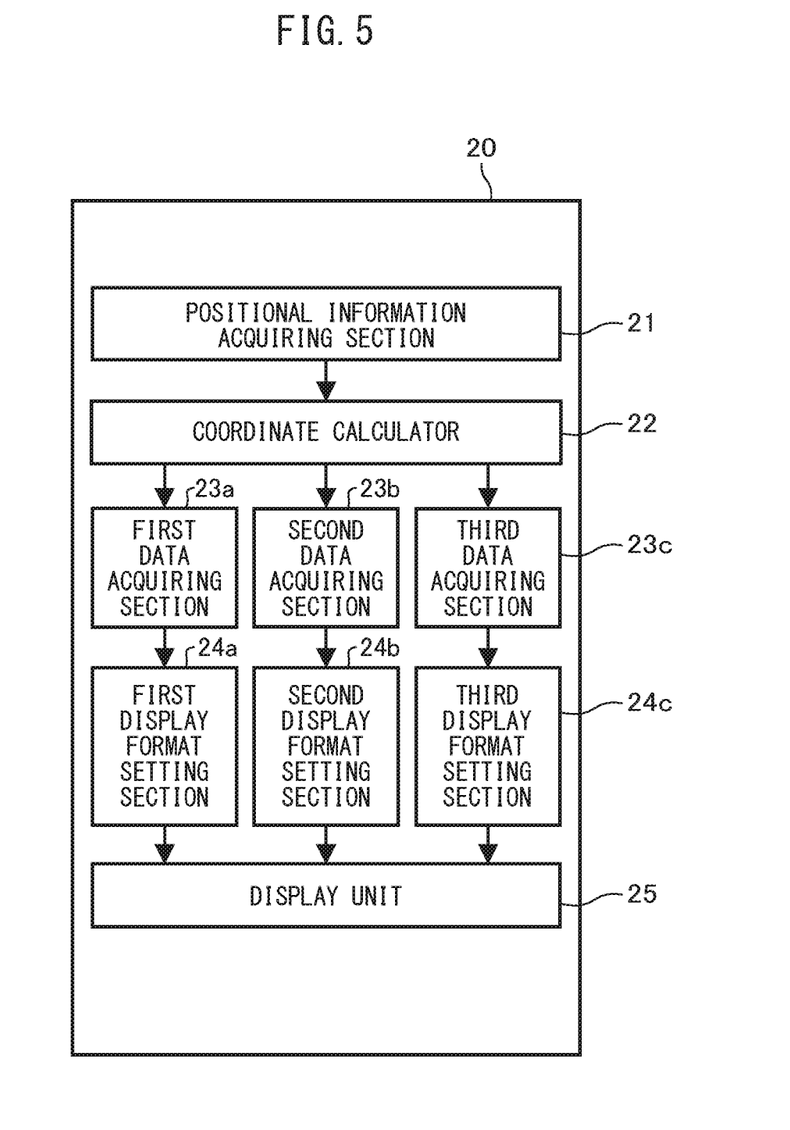
FIG. 5 is a functional block diagram of a machining route display device according to a second embodiment.

FIG. 5 is a functional block diagram of a machining route display device according to the second embodiment. The machining route display device 20 shown in FIG. 5 is connected to the laser machine 1 via the numerical control device 16. The machining route display device 20 includes a third data acquiring section 23c in addition to the first data acquiring section 23a and the second data acquiring section 23b. The third data acquired by the third data acquiring section 23c may be the same as the first data and the second data described above. In addition to the first display format setting section 24a and the second display format setting section 24b, the machining route display device 20 includes a third display format setting section 24c. The CPU of machining route display device 20 serves as the third data acquiring section 23c and the third data display format setting section 24c.

Figure 6:
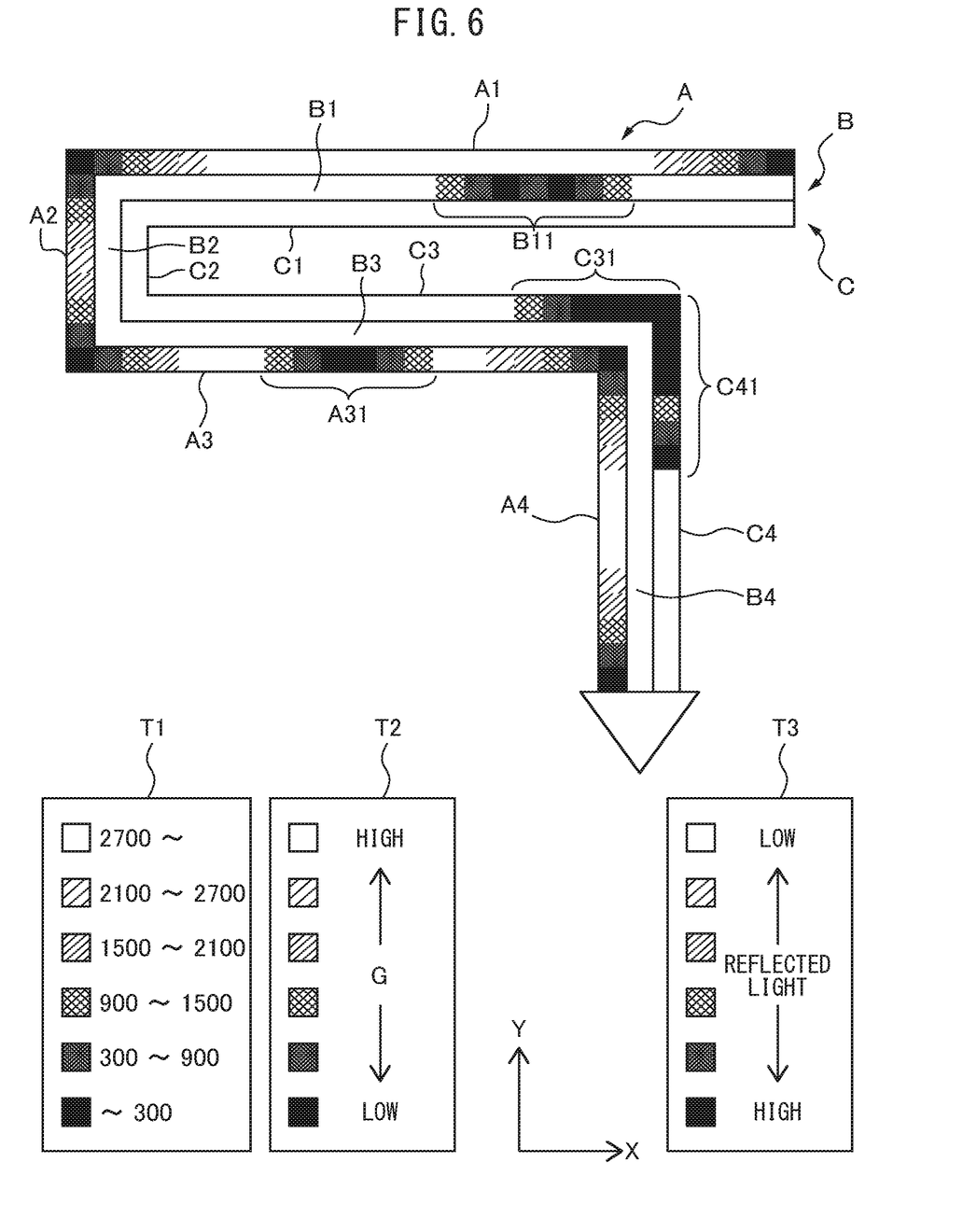
FIG. 6 is a diagram showing yet another example of a machining route.

FIG. 6 is a diagram showing yet another example of a machining route. In this instance, the first data acquiring section 23a is the laser power sensor 6, the second data acquiring section 23b is the gap measurement unit 5, and the third data acquiring section 23c is the reflected light acquiring section 7. Since the procedures of the machining routes A, B, and C in FIG. 6 are the same as those described with reference to FIG. 2, descriptions thereof have been omitted.

In FIG. 6, it can be seen that laser output is extremely small in portion A31 of line segment A3 of the machining route A. Further, in the same manner as described above, in portion B11 of line segment B1 of the machining route B, the workpiece W is undulated while the gap amount G is small. In addition, the reflected light is locally increased in portion C31 of line segment C3 and portion C41 of line segment C4 of the machining route C.

Therefore, when a machining defect occurs in the workpiece W, it is possible to immediately determine whether the machining defect is caused by laser output, the reflected light, or the size of the gap, based on the location where the machining defect occurs. In other words, in the second embodiment, since three information amounts are included by the machining routes A, B, and C, the operator can more clearly and quickly identify the cause of the machining defects. Incidentally, the provisions of a larger number of data acquiring sections and display format setting sections is within the scope of the present invention.

As described above, the laser output acquiring sections (first data acquiring section 23a to third data acquiring section 23c) acquire laser output command values or actual laser output values. Therefore, the display section 25 displays the machining route A using a display format determined from laser output command value, or displays the machining route A using a display format determined from the actual laser output value. Therefore, the relationship between laser output command value or the actual laser output value and the machining route A can be easily recognized. The laser output acquiring sections may also obtain deviations between the laser output command value and the actual laser output value to display the deviations along with the machining route in the same manner as described above.

Further, when the positional information serving as the position command obtained from machining program 17 is obtained, the relationship between the laser output and the machining route composed of the command positions can be easily recognized. Similarly, it can be understood that when the positional information is determined as the actual positions determined from position detectors E1 and E2, the relationship between laser output and the machining route composed of the actual positions can be easily recognized.

Aspects of the Disclosure

According to the first aspect, there is provided a machining route display device (20) for displaying a machining route in a laser machine (1) for laser machining a workpiece with a laser output from a laser machining head (8) while relatively moving the laser machining head and the workpiece with at least one drive shaft, the device comprising a positional information acquiring section (21) configured to acquire positional information of the at least one drive shaft for each predefined control cycle, a laser machining head coordinate calculator (22) configured to calculate a coordinate value of the laser machining head from the positional information of the at least one drive shaft and machine configuration information of the laser machine, a first data acquiring section (23a) configured to acquire first data relating to the laser machining, a second data acquiring section (23b) configured to acquire second data relating to the laser machining, a first display format setting section (24a) configured to set at least one of a display color of the first data and a shade of the display color as a display format of the first data, a second display format setting section (24b) configured to set at least one of a display color of the second data and a shade of the display color as a display format of the second data, and a display section configured to display the machining route based on coordinate values of the laser machining head calculated by the laser machining head coordinate calculator and the display formats set by the first display format setting section and the second display format setting section, wherein at least one of the display color of the first data and the shade of the display color of the first data is changed in accordance with the first data acquired by the first data acquiring section, and at least one of the display color of the second data and the shade of the display color of the second data is changed in accordance with the second data acquired by the second data acquiring section.

According to the second aspect, in the first aspect, the first data acquiring section is a laser output acquiring section (6) configured to acquire a laser output value of the laser outputted from the laser machining head, and the second data acquiring section is a reflected light acquiring section (7) configured to acquire reflected light reflected by the laser on the workpiece.

According to a third aspect, in the first aspect, the first data acquiring section is a laser output acquiring section (6) configured to acquire a laser output value of the laser outputted form the laser machining head, and the second data acquiring section is a gap measurement unit (5) configured to measure a gap between the laser machining head and the workpiece.

According to the fourth aspect, the first aspect further comprises a third data acquiring section (23c) configured to acquire third data related to the laser machining, and a third display format setting section (24c) configured to set at least one of a display color of the third data and a shade of the display color as a display format of the third data, wherein the display section display the machining route based on the coordinate values of the laser machining head and the display formats set by the first display format setting section, the second display format setting section, and the third display format setting section, and at least one of the display color of the third data and the shade of the display color is change in accordance with the third data acquired by the third data acquiring section.

According to the fifth aspect of aspect, in the fourth aspect, the first data acquiring section is a laser output acquiring section (6) configured to acquire a laser output value of the laser outputted from the laser machining head, the second data acquiring section is a reflected light acquiring section (7) configured to acquire reflected light reflected by the laser on the workpiece, and the third data acquiring section is a gap measurement unit (5) configured to measure a gap between the laser machining head and the workpiece.

According to a sixth aspect, in any of the second, third and fifth aspects, the laser output value obtained by the laser output acquiring section is a laser output command value of the laser machining head obtained from a machining program, an actual laser output value of the laser machining head obtained using a laser power sensor, or a difference between the laser output command value and the actual laser output value.

According to a seventh aspect, in any one of the first to sixth aspects, the positional information obtained by the positional information acquiring section is positional information determined from a machining program for machining the workpiece with the laser or positional information determined by a position detector configured to drive the at least one drive shaft.

Effects of Aspects

In the first aspect, since the machining route is displayed after the display formats of the first data and the second data have been set according to the respective values of the first data and the second data relating to laser machining, the relationship between the machining route and the first data and the second data can be easily recognized.

In the second aspect, the position of the laser machining head when the reflected light can damage laser machining head or laser oscillator can be easily understood. Thus, for a subsequent workpiece, it is possible to avoid damaging the laser machining head or the laser oscillator by locally reducing laser output or the like.

In the third aspect, the position of the laser machining head when the laser machining head can collide with the workpiece can be easily understood. Thus, for a subsequent workpiece, it is possible to prevent the laser machining head from colliding with the workpiece by locally raising the position of the laser machining head relative to the workpiece or smoothing the workpiece in advance.

In the fourth aspect, since the machining route is displayed after the display format of the third data has been set according to the value of the third data relating to laser machining, the relationship between the machining route and the third data can be additionally recognized. As a result, it is possible to immediately determine which of the first data to the third data is the cause of the machining defects in the workpiece.

In the fifth aspect, when a machining defect occurs in the workpiece, it is possible to immediately determine whether the cause of the machining defect is laser output, the reflected light, or the size of the gaps in addition to the place where the machining defect has occurred.

In the sixth aspect, the relationship between the laser output command value or actual laser output value and the machining route can be easily recognized.

In the seventh aspect, the positional information determined from the machining program is the position command and the positional information determined from the position detector is the actual position. The relationship between the laser output and the machining route constituted by the commanded position, and the relationship between the laser output and the machining route constituted by the actual position can be easily recognized.

While embodiments of the present invention have been described above, it will be understood by those skilled in the art that various modifications and changes may be made therein without departing from the scope of the following claims.

The invention claimed is:

1. A machining route display device for displaying a plurality of machining routes juxtaposed with each other in a laser machine for laser machining a workpiece with a laser output from a laser machining head while relatively moving the laser machining head and the workpiece with respective drive shafts, wherein a number of the drive shafts corresponds to a number of movable directions for the machining of the workpiece, the device comprising:
a processor configured to:
acquire positional information of the respective drive shaft for each predefined control cycle;
calculate a coordinate value of the laser machining head for each unit of time of the acquired positional information of the respective drive shaft and machine configuration information of the laser machine,
acquire first data relating to the laser machining for the each unit of time, wherein the first data for the each unit of time acquired by the processor is a laser output value of the laser outputted from the laser machining head,
acquire second data for the each unit of time relating to the laser machining, wherein the second data for the each unit of time is data different from the first data for the each unit of time, and wherein the second data for the each unit of time is at least one of a gap amount between the laser machining head and the workpiece or a reflected light reflected by the laser on the workpiece,
set at least one of a display color of the first data for the each unit of time and a shade of the display color as a display format of the plurality of machining routes for the first data for the each unit of time for each of the predefined control cycles, wherein the shade of the display color along the plurality of machining routes for each of the predefined control cycles corresponds to a level of magnitude of the laser output value of the first data for the each unit of time from the laser machining head,
set at least one of a display color of the second data for the each unit of time and a shade of the display color as a display format of the plurality of machining routes for the second data for the each unit of time for each of the predefined control cycles, wherein the shade of the display color of the second data along the plurality of machining routes for each of the predefined control cycles corresponds to a level of magnitude of the second data for the each unit of time, and
display, based on the calculated coordinate values of the laser machining head, the respective juxtaposed machining routes for each of the predefined control cycles for the first data for the each unit of time and the second data for the each unit of time, and display the respective corresponding display formats for the first data for the each unit of time and the second data for the each unit of time, wherein
at least one of the display color of the first data for the each unit of time of the laser output value and the shade of the display color of the first data for the each unit of time of the laser output value is changed in accordance with the level of magnitude of the first data for the each unit of time, and at least one of the display color of the second data for the each unit of time and the shade of the display color of the second data for the each unit of time is changed in accordance with the level of magnitude of the second data for the each unit of time,
the display format for each of the plurality of machining routes for each of the predefined control cycles providing a visual relationship between the laser output of the first data for the each unit of time and the at least one of the gap amount or the reflected light of the second data for the each unit of time.

2. The machining route display device according to claim 1, wherein the processor is further configured to acquire third data for the each unit of time related to the laser machining,
set at least one of a display color of the third data for the each unit of time and a shade of the display color as a display format of the third data for the each unit of time, wherein the shade of the display color of the third data for the each unit of time along the plurality of machining routes for each of the predefined control cycles corresponds to a level of magnitude of the third data for the each unit of time,
display the plurality of machining routes for each of the predefined control cycles based on the coordinate values of the laser machining head and the display formats of the first data for the each unit of time, the second data for the each unit of time, and the third data for the each unit of time, and at least one of the display color of the third data for the each unit of time and the shade of the display color is changed in accordance with the acquired third data for the each unit of time.

3. The machining route display device according to claim 2, wherein the first data for the each unit of time acquired by the processor is a laser output value of the laser outputted from the laser machining head, the second data for the each unit of time acquired by the processor is reflected light reflected by the laser on the workpiece, and the third data for the each unit of time acquired by the processor is a measure of gap between the laser machining head and the workpiece.

4. The machining route display device according to claim 1, wherein the laser output value acquired by the processor is a laser output command value of the laser machining head obtained from a machining program, an actual laser output value of the laser machining head obtained using a laser power sensor, or a difference between the laser output command value and the actual laser output value.

5. The machining route display device according to claim 1, wherein the positional information acquired by the processor is positional information determined from a machining program for machining the workpiece with the laser or positional information determined by a position detector configured to drive the at least one drive shaft.

* * * * *